United States Patent [19]

Gaskill, Jr. et al.

[11] 4,168,505
[45] Sep. 18, 1979

[54] STYLUS CONSTRUCTION

[75] Inventors: David M. Gaskill, Jr., Providence; Rudolph F. D'Agostino, Greenville, both of R.I.

[73] Assignee: Atlan-Tol Industries, Inc., West Warwick, R.I.

[21] Appl. No.: 948,585

[22] Filed: Oct. 4, 1978

[51] Int. Cl.² .................. G01D 15/16; G01D 15/10; H05B 1/00
[52] U.S. Cl. .......................... 346/139 C; 346/76 R; 219/216
[58] Field of Search ........... 346/76 PH, 76 R, 139 C, 346/153, 162; 219/216

[56] References Cited

U.S. PATENT DOCUMENTS

| 3,626,422 | 12/1971 | Lloyd | 346/139 C UX |
| 3,789,423 | 1/1974 | Fawcett | 346/139 C X |
| 3,813,677 | 5/1974 | Shimotsuma | 346/76 R |
| 3,814,897 | 6/1974 | Otani et al. | 346/76 PH X |
| 3,971,042 | 7/1976 | Ring | 346/139 C |
| 4,027,311 | 5/1977 | Ambrosio | 346/139 C X |

Primary Examiner—George H. Miller, Jr.
Attorney, Agent, or Firm—Salter & Michaelson

[57] ABSTRACT

A stylus for the thermal recording of information on a heat sensitive recording medium which includes an electrically insulated member of low thermal conductivity which supports a pair of electrical conductor strips on the sides thereof so as to dispose such strips in opposed spaced relationship to each other. The conductor strips run along the length of the member and terminate at the lower end thereof. That end is also coated with an electrically resistive film which contacts the lower spaced ends of the conductor strips so as to form a current path therebetween. Electrical connections are attached to the upper ends of the strips for connecting the current path to a power source such that current passing through the path produces localized heat at the stylus tip.

11 Claims, 8 Drawing Figures

U.S. Patent   Sep. 18, 1979   4,168,505
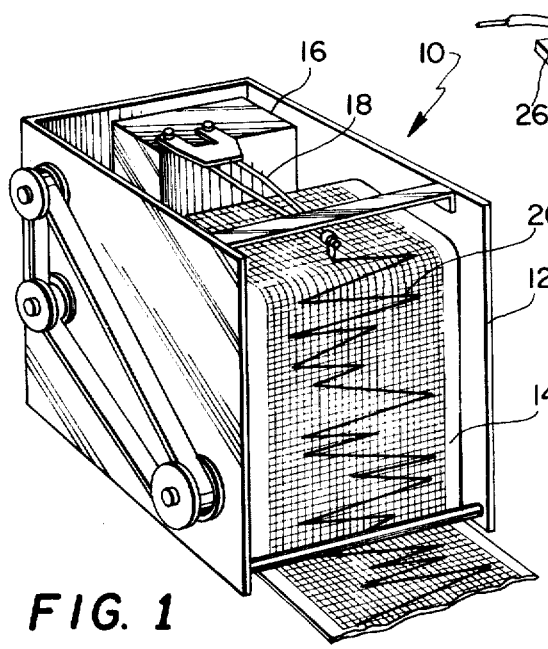
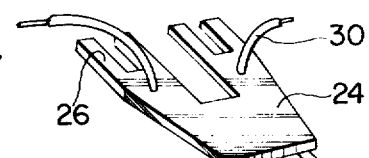
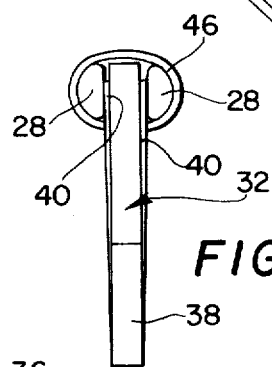
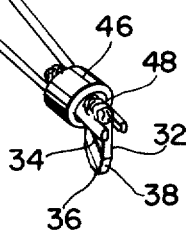
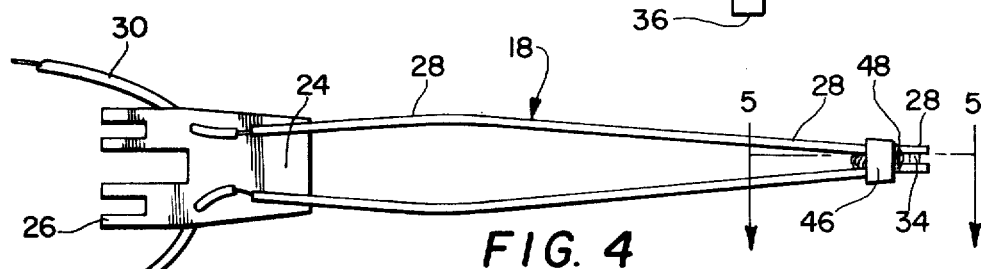
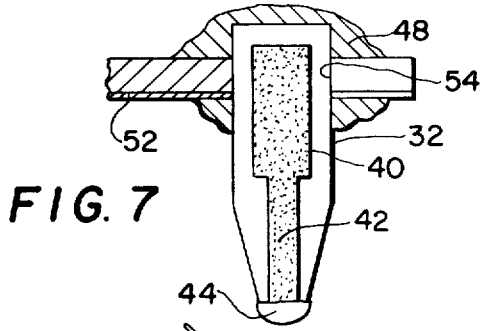
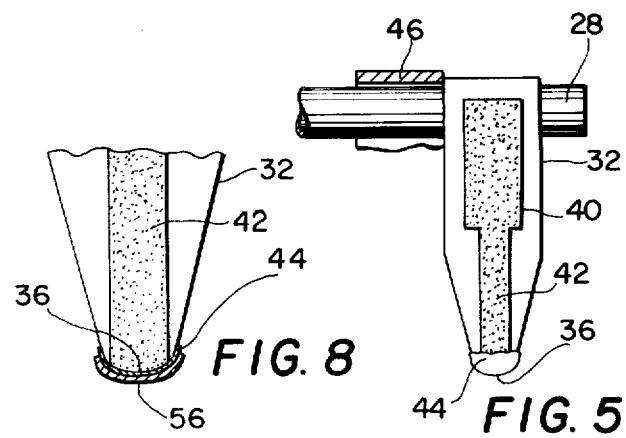
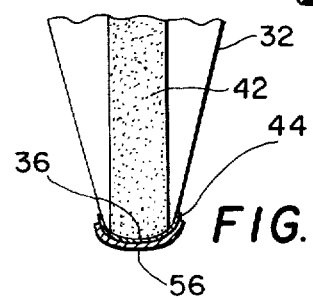
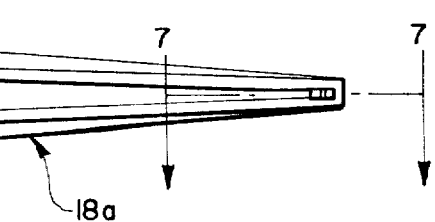

STYLUS CONSTRUCTION

BACKGROUND AND SUMMARY OF THE INVENTION

This invention relates to a printing stylus for chart recorders and the like and particularly a thermally activated stylus which records information on a heat sensitive recording medium. Such stylus constructions are often operated by producing heat in one location and thereafter conducting such heat to a more localized area subsequently adapted for contact with the surface of the heat sensitive paper or by producing the heat directly at the localized area in which it is desired. The former type construction has the disadvantage of generating a substantially greater amount of heat than is necessary while the latter involves constructions which may exhibit rather complex physical configurations or semiconductor tecnology involving rather high initial fixed costs. An example of the former type construction is shown in U.S. Pat. No. 3,689,937. An example of the latter is shown in U.S. Pat. 3,814,897 issued June 4, 1974.

An object of the present invention is the provison of a thermal stylus construction which avoids the prior drawbacks and yet which serves to localize heat produced at the point of use in such a manner so as to diminish power requirements, eliminate the necessity of a heat reservior and to insure fast warm-up.

A further object of the present invention is the provision of a stylus construction of the above-indicated type which further exhibits desirable wear characteristics and which is of straightforward physical construction such that it may be formed at a relatively low cost and involving generally uncomplicated technology.

These and other objects of the present invention are accomplished by the provision of a thermal stylus in which a pair of electrical conductor strips are disposed in contact with opposed surface portions of a generally elongated insulative member having low thermal conductivity and which terminates in a relatively small tip portion. A coating of an electrically resistive film is disposed over the member tip. The coating contacts the spaced lower ends of the strip so as to form a current path therebetween and electrical connections are attached to the upper ends thereof for connecting the path to a power source wherein current passing through the path heats the tip of the stylus. The coating may be of a wear-resistant, ceramic material such as glass with electrically conductive particles dispersed therein such that desirable wear characteristics are produced in a straightforward economical manner.

Other objects, features and advantages of the invention shall become apparent as the description thereof proceeds when in connection with the accompanying illustrative drawing.

DESCRIPTION OF THE DRAWING

In the drawing which illustrates the best mode presently contemplated for carrying out the present invention:

FIG. 1 is a perspective view showing a chart recorder of the type in which the stylus of the present invention may be utilized;

FIG. 2 is a perspective view of one form of stylus constructed in accordance with the present invention;

FIG. 3 is a front end view thereof;

FIG. 4 is a top plan view thereof;

FIG. 5 is a sectional elevation taken along the line 5—5 of FIG. 4;

FIG. 6 is a top plan view of a modified form of stylus construction made in accordance with the present invention;

FIG. 7 is an elevational section thereof taken along the line 7—7 of FIG. 6 and

FIG. 8 is a partial side elevation of the tip protion of a still further modified form of the invention which may be utilized in cooperation with either of the forms shown in FIGS. 2 through 5 and FIGS. 6 and 7.

DESCRIPTION OF THE INVENTION

FIG. 1 shows a chart recorder 10 which includes a housing 12, a strip of heat sensitive recording paper 14 and a print station 16 which converts electrical input signals into physical movement of a thermal stylus 18 such that a printed record 20 representative of the variations of such input signals is created. Such above-indicated devices are conventional and the present invention is directed to improved stylus constructions which may be used in such devices.

Turning now to FIGS. 2 through 5 of the drawing, a preferred form of the stylus 18 is shown. Such includes a base or plate 24 which serves to physically interconnect the stylus 18 to the recorder 10. Such base is generally flat and includes slotted extensions 26. The stylus 18 may be pivotally mounted with respect to the recorder 10 so that as various electrical signals are imparted to the stylus, it moves across the face or surface of the recording paper 14 so as to produce a visible record 20 thereon. A pair of spaced wire struts 28 are physically attached to the base 24 as by soldering and each are provided with an electrical connection at such end as by means of wires 30 soldered thereto. At the opposite end of the stylus 18, the wire struts 28 are spaced in close proximity to each other so as to support an elongated core or member 32 therebetween. This member is electrically insulative and of generally low thermal conductivity. The shape of member 32 includes relatively flat sidewalls 34 which terminate in a relatively small tip 36 as by the inward tapering of the edge walls 38 thereof.

A pair of electrical condutor strips 40 extend along the opposite sides 34 from the upper portion of the member 32 to the tip 36 thereof. The conductors may be formed of 10/90 tin-lead solder material attached to the side surfaces 34 thereof by various known techniques including liquid deposition. The member 32 is preferably formed of a ceramic substrate, e.g., alumina and therefore exhibits both low thermal and electrical conductivity whereas the strips 40 are both good electrical and heat conductors. The lower portion 42 of the conductor strip 40 is preferably of narrower width and the strips terminate at the lower end or tip 36 of the member 32 in spaced relationship to each other, that is, they are spaced apart from each other by reason of the thickness of the member 32 at that point.

A coating 44 of electrically resistive material is disposed over the member tip 36 and serves to connect the spaced lower ends of the conductor strips 40 so as to form a current path therebetween. such coating may be liquid deposited onto the tip as by known techniques and preferably is of a ceramic non-conductive material having conductive particles dispersed therein. A suitable material includes a glass slurry deposited on the tip 36 by contact therewith when in liquid form or deposited thereon in a solid or semi-solid state and thereafter fused to the member. The desired resistivity of the film may be arrived at by varying the density of the conductive particles mixed therein.

As best seen by FIG. 3, the struts 28 physically contact the opposite sides 34 of the member 32 so as to support such in the desired position. Such physical relationship may be maintained by the presence of an encircling collar 46 which forces the ends of the struts 28 together which in turn entrap and hold the member 32 therebetween. In order to insure such relationship is maintained, as during use and when subject to vibration and the like, a non-conductive adhesive composition 48 may be deposited between the collar 46, the struts 28 and about the upper surface of the member 32. Conventional epoxy adhesive has proved suitable for such purpose. It may thus be seen that the electrically conductive struts serve to electrically connect the power source (not shown) through the wire leads 30 to the conductor strips 40 by reason of the physical contact of the struts 28 on opposite sides of the member 32 at the upper portion thereof. Accordingly, current from the power source moves down the conductive strips 40 and then through the current path at the tip of the member 32 defined by resistive coating 44 such that heat is formed at such localized portion. Also, the narrowing of the conductor strips 40 at the lower portions 42 thereof serves to retain such heat at the tip 36 since heat may not be as readily dissipated from such tip through the reduced heat conductive path. It should also be pointed out that the collar 46 as well as the adhesive material 48 would necessarily be of an electrically non-conductive nature.

Turning now to FIGS. 6 and 7 of the drawing, a modification of the stylus is shown. Such stylus 18a includes a base 24a, leads 30a and a sheet of non-conductive material 50 such as Bakelite and the like in turn connected to the plate 24a and upon which conductor strips 52 of electrically conductive material, such as solder, are formed as by dip soldering techniques. The strips 52 are spaced along the narrowing extent of the sheet 50 and each contact one of the conductor strips 40 at the upper ends thereof. The conductor strips 52 as well as the conductor strips 40 are maintained in spaced relationship except for the coating 44 at the lower end thereof by means of epoxy cement 48 which additionally serves to physically attach the member 32 to the sheet 50. An oppening or notch 54 is provided through the sheet at the terminal end thereof for receipt of the upper end of the member 32. It may thus be seen that the embodiment of the invention shown in FIGS. 6 and 7 and referred to a stylus 18a functions in the same manner as that depicted in FIGS. 2 through 5 and referred to by the reference numeral 18.

A further modification of the stylus construction of the present invention and which is applicable to both forms 18 and 18a thereof is shown in FIG. 8 of the drawing. Therein, an additional coating 56 of ceramic material such as glass is provided at the tip 36. Such coating or surface 56 is desirable when the electrically resistive coating 44 providing a current path between the conductor surfaces 40 is of a relatively soft material so as not to be able to effectively function as a writing tip. The coating 56 does not necessarily include conductive particles as its function is primarily to augment the wear characteristics of the heat producing resistive coating 44, where such does not per se exhibit sufficient wear resistance. Of course, where the film 44 is of a hard material, such as the glass slurry aforedescribed, no protective coating 56 is necessary.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is clamed is:

1. A thermal stylus for generating localized heat at a tip thereof for thermally recording information on a heat sensitive recording medium, comprising an electrically insulative member of low thermal conductivity which terminates at one end thereof in a relatively small tip, a pair of electrical conductor strips disposed in contact with opposed surface portions of said member so as to space said strips from each other along the length of said member, a coating of an electrically resistive film disposed over said member tip, said coating contacting the spaced lower ends of said strips so as to form a current path therebetween, and electrical connections atached to the upper ends of said strips for connecting said path to a power source wherein current passing through said path heats the tip of said stylus.

2. The stylus construction of claim 1, wherein said resistive coating is formed from a deposit of a ceramic slurry having electrically conductive particles dispersed therein.

3. The stylus construction of claim 1, wherein said ceramic is glass.

4. The stylus construction of claim 1, said member being a generally flat elongated member tapered at the lower end thereof to form said tip.

5. The stylus construction of claim 1, said strips being of narrower width adjacent their connection with said coating than at their upper ends where they are joined to said electrical connections so as to reduce heat transfer away from said tip along said strips.

6. The stylus construction of claim 1 including a base for attaching said stylus to a recording means, and means for interconnecting said base with said member, so as to physically support said member at a location distal from said base.

7. The stylus construction of claim 6, said interconnection means including a sheet of stiff insulative material connected to said base at one end and having an opening for receipt of said member at the other end, said sheet supporting a pair of spaced electrically conductive strips in turn connected with the strips disposed on the sides of said member.

8. The stylus construction of claim 7, including an insulative adhesive cement disposed at the other end of said sheet for interconnecting said member to said sheet.

9. The stylus construction of claim 6, said interconnection means including a pair of spaced self-supporting electrically conducting struts each connected to said base on one end and disposed on an oposite side of said member at their other ends, and in electrical contact with said strips, an electrically insulative collar encircling said struts at said other ends thereof.

10. The stylus construction of claim 9, said collar positioned adjacent said member.

11. The stylus construction of claim 9 including an insulative adhesive cement disposed between said struts, said collar and about said member for physically interconnecting said struts, said collar and said member with each other.

* * * * *